Figures 1, 2:
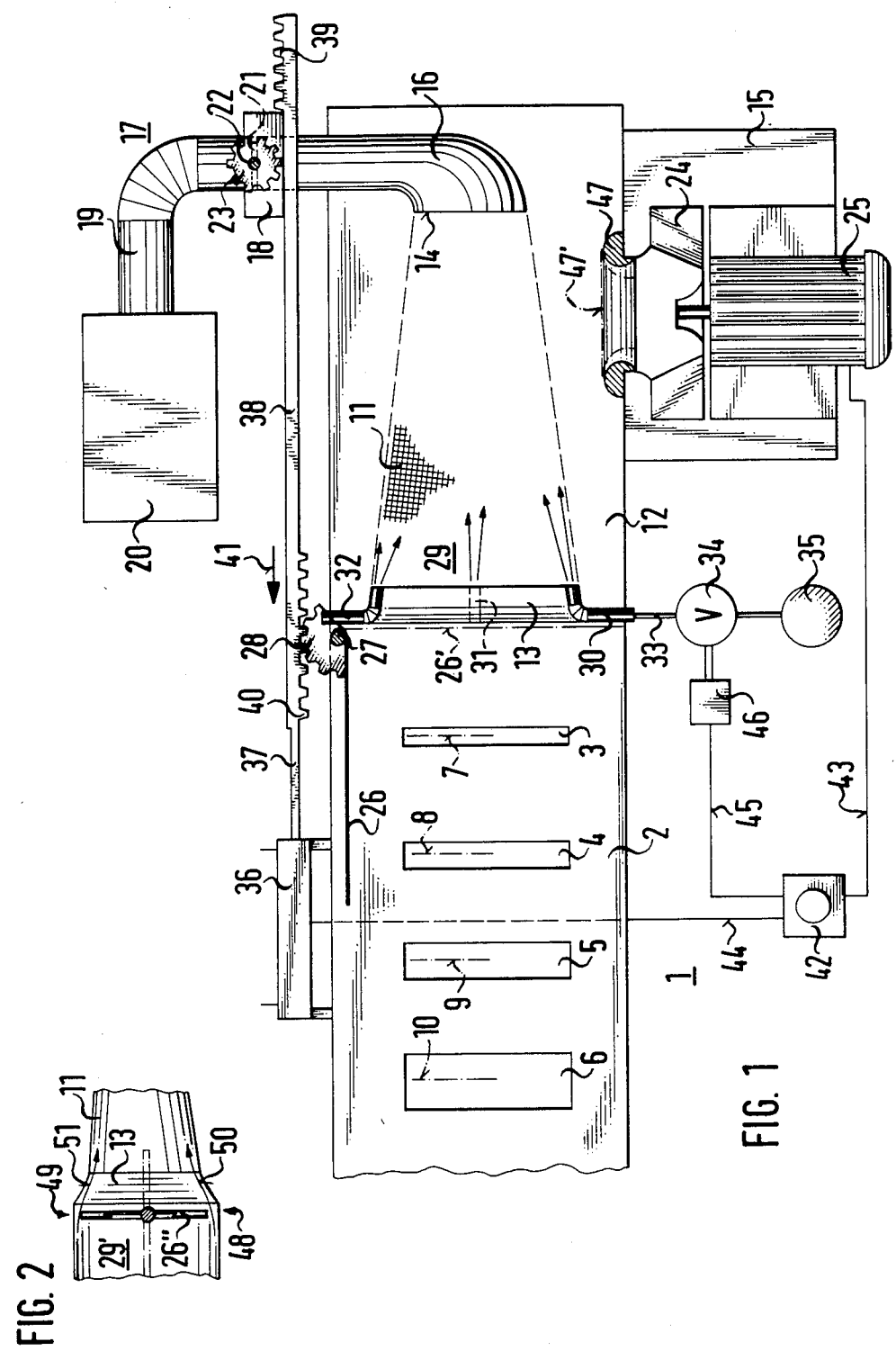

United States Patent [19]

Horak et al.

[11] Patent Number: 4,719,662
[45] Date of Patent: Jan. 19, 1988

[54] DUST-REMOVAL APPARATUS FOR TEXTILE MACHINES AND MACHINE ROOMS

[75] Inventors: Dieter Horak, Monchen-Gladbach; Hans-Heinz Schäfer, Schwalmtal; Wilhelm Schmitz, Monchen-Gladbach, all of Fed. Rep. of Germany

[73] Assignee: W. Schlafhorst & Co., Monchen-Gladbach, Fed. Rep. of Germany

[21] Appl. No.: 931,700

[22] Filed: Nov. 17, 1986

[30] Foreign Application Priority Data

Nov. 16, 1985 [DE] Fed. Rep. of Germany ....... 3540688
Aug. 30, 1986 [DE] Fed. Rep. of Germany ....... 3629559

[51] Int. Cl.⁴ .............................................. A47C 9/20
[52] U.S. Cl. ........................................ 15/301; 15/352; 55/272; 55/288; 55/303
[58] Field of Search .................... 15/301, 352; 55/303, 55/301, 288, 272

[56] References Cited

U.S. PATENT DOCUMENTS

| | | | |
|---|---|---|---|
| 2,889,048 | 6/1959 | Nordin | 55/301 X |
| 2,977,181 | 3/1961 | Reiterer | 15/301 X |
| 3,486,309 | 12/1969 | Wild | 15/301 X |
| 3,545,178 | 12/1970 | Sheehan | 55/272 |
| 3,593,961 | 5/1976 | Harrop et al. | 55/272 X |
| 3,667,093 | 6/1972 | Culpepper | 15/301 X |
| 3,887,344 | 6/1975 | Smith | 55/301 X |

Primary Examiner—Chris K. Moore
Attorney, Agent, or Firm—Herbert L. Lerner; Laurence A. Greenberg

[57] ABSTRACT

A dust-removal apparatus for textile machines and machine rooms includes a chamber containing dust-laden air, a clean-air chamber, a tube disposed between and separating the chamber containing dust-laden air from the clean-air chamber, at least part of the tube being a filter element, a suction device connected to the clean-air chamber, another switchable suction device in the form of a filter cleaning device connected to the tube, the tube having an inlet end, and a device for selectively closing the inlet end of the tube.

15 Claims, 2 Drawing Figures

DUST-REMOVAL APPARATUS FOR TEXTILE MACHINES AND MACHINE ROOMS

The invention relates to a dust-removal apparatus for textile machines and machine rooms, having a filter element separating a chamber carrying dust-laden air from a clean-air chamber, and a suction device connected to the clean-air chamber is.

Operating a dust-removal apparatus for textile machines and machine rooms is problematic, among other reasons because of the fact that the filter elements very quickly develop a mat of fibers, which hinders the passage of air through the filter element; the result is that the inflow and outflow lines become stopped up and an undesirable accumulation of readily flammable materials increases progressively.

Formerly, attempts were made to address these problems by enlarging the filter surface area and by cyclically cleaning or replacing the filter elements. However, not only did the equipment required for this take up a great deal of space, but it did not lessen the fire hazard.

It is accordingly an object of the invention to provide a dust-removal apparatus for textile machines and machine rooms, which overcomes the hereinafore-mentioned disadvantages of the heretofore-known devices of this general type, that is efficient, small in size and with which there is little fire hazard.

With the foregoing and other objects in view there is provided, in accordance with the invention, a dust-removal apparatus for textile machines and machine rooms, comprising a chamber containing dust-laden air, a clean-air chamber, a tube disposed between and separating the chamber containing dust-laden air from the clean-air chamber, at least part of said tube being a filter element, a suction device connected to the clean-air chamber, another switchable suction device in the form of a filter cleaning device connected to the tube, the tube having an inlet end, and means for selectively closing said inlet end of said tube, preferably in the form of a switchable shutting device.

In accordance with another feature of the invention, the tube protrudes from the chamber carrying dust-laden air into the clean-air chamber.

As soon as a certain amount of fiber material has accumulated on the inside of the filter element, the shutting device is closed and the other suction device is switched on. This causes a flow of air from the clean-air chamber to enter the tube through the filter element, which is intended to loosen the fiber material from the surface of the filter element. Subsequently the fiber material is sucked by the other suction device. If the other suction device has suitably strong suction power, then the suction device that functions during machine operation, does not need to be switched off during the cleaning operation.

In accordance with a further feature of the invention, the tube protruding into the clean-air chamber is in the form of a funnel having a tapered end connected to the other switchable suction device. Constructing the tube in funnel-like fashion reinforces the rapid and intensive removal of the accumulated dust.

In accordance with an added feature of the invention, the tube is entirely in the form of a filter element. The entire tube can then be utilized as a filter surface.

In accordance with an additional feature of the invention, there is provided a waste dump subjected to negative pressure, the other switchable suction device being in the form of a valve connected to the waste dump. The waste dump may be located far outside the textile machines or machine rooms that are at risk.

In accordance with yet another feature of the invention, the switchable shutting device is in the form of a flap selectively blocking and clearing the inlet of the tube. The flap may, for instance, be disposed directly before the tube that protrudes into the clean-air chamber. However, it may also be disposed somewhat farther away from this location, in the chamber or inflow channel carrying dust-laden air.

In textile machines that have a plurality of work stations, such as automatic cheese or cross-wound bobbin winding machines, the filter element may be stopped up or uneven accumulations of dirt may nevertheless occur.

In order to eliminate this disadvantage as well, in accordance with yet a further feature of the invention, the filter element includes a device for loosening adhering accumulations of dust, optionally cooperating with the filter cleaning device. This prevents the filter element from becoming increasingly stopped up with firmly adhering fine dust particles, fiber material or the like.

As soon as a certain amount of fiber material has accumulated on the inside of the filter element, the other suction device is switched on and the device for loosening adhering dust accumulations is simultaneously activated either briefly or at a plurality of brief intervals. The fiber material is loosened from the surface of the filter element and sucked away by the other suction device. The first suction device, that is, the service suction device, need not be switched off during the cleaning of the filter element, as long as the filter cleaning device or the other suction device operates with a sufficient degree of negative pressure or suction.

In accordance with yet an added feature of the invention, the textile machine has work stations, the chamber containing dust-laden air is in the form of a channel extended along the textile machine, and the channel has a row of suction openings formed therein, each of the openings being associated with a respective one of the work stations.

In a textile machine, it is the yarn delivery stations in particular, which preferably have a certain height and have to be aspirated or subjected to suction. Therefore, in accordance with yet an additional feature of the invention, the suction openings formed in the channel carrying dust-laden air have openings with increasing widths as viewed in direction away from the filter element. As a result, each of the work stations is aspirated or subjected to suction uniformly.

In accordance with still another feature of the invention, the filter element is in the form of a funnel having a larger funnel end and an inner wall, and the device for loosening adhering dust accumulations includes blower nozzles disposed at the larger funnel end and oriented substantially parallel to the inner wall of the filter element. The blower nozzles sweep over the inner wall of the filter element and thereby effect the rapid loosening of the dust accumulations. As a result, dirt is removed not only faster, but also more intensively and thoroughly.

In order to ensure that the cleaning operation takes a trouble-free course, in accordance with still a further feature of the invention, the chamber containing dust-laden air is in the form of a channel extended along the textile machine, and there is provided a locking device through which the filter cleaning device locks the switchable shutting device for shutting off the channel and through which the switchable device locks the filter cleaning device. As long as the shutting device is open, the filter cleaning device remains shut. It is only after the shutting device closes that the filter cleaning device can be opened. When the filter cleaning device is open, the shutting device cannot be actuated. Only after the filter cleaning device has been shut off once again can the device for shutting the channel be opened once again.

Therefore in accordance with still an added feature of the invention, there is provided a common drive mechanism for the switchable device for shutting off the channel and the filter cleaning device, the locking device being in the form of a control device connected from the drive mechanism to the shutting device and the filter cleaning device. The control device assures that upon actuation of the drive mechanism, the shutting device is closed first, then the filter cleaning device is activated and after the end of filter cleaning, the filter cleaning device is first shut off before the device for shutting the channel is reopened.

Filter cleaning must be performed at shorter or longer intervals depending on how dirty the filter becomes. Therefore, in accordance with still an additional feature of the invention, there is provided an adjustable timer switch connected to the common drive mechanism for initiating a filter cleaning operation at adjustable intervals.

In accordance with a concomitant feature of the invention, the filter element has an inner surface and includes a device for loosening adhering accumulations of dust, and the switchable shutting device is a centrally pivotable throttle flap having a closed throttling position defining at least one annular gap between the flap and the inner surface through which cleaning air can be directed against the inner surface of the filter element.

When the throttle flap is set or closed, the air flow is spontaneously accelerated and deflected by the edge of the throttle flap. Since the throttle flap is centrally pivotable, the suction operation does not have to be temporarily shut off or throttled. The result of the air flow is that the dust accumulations or mat of fibers already formed as a result of the dust accumulations, are loosened. The other suction device or filter cleaning device then eliminates or removes the loosened accumulation of dust.

Other features which are considered as characteristic for the invention are set forth in the appended claims.

Although the invention is illustrated and described herein as embodied in a dust removal apparatus for textile machines and machine chambers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, side-elevational view of an apparatus according to the invention; and FIG. 2 is a fragmentary, side-elevational view of another embodiment of the apparatus.

Referring now to the figures of the drawings in detail and first, particularly, to FIG. 1 thereof, there is seen a dust-removal apparatus 1, the walls of which are made of sheet metal. The apparatus 1 has a chamber 2 filled with dust-laden air, which is in the form of a channel extending along the textile machine, that is not shown in detail in the drawings. The channel 2 has a row of suction openings, the suction openings 3, 4, 5 and 6 of which are visible in the drawing. The suction openings 3-6 are each associated with a given one of the work stations of the textile machine. The work stations, which are intended to be cop unwinding stations of an automatic winding machine, are symbolically represented by center lines 7-10.

A tube 11 extends between the channel 2 and a clean-air chamber 12. The tube 11 is constructed as a filter element and is substantially formed of a conical, funnel-shaped wire screen. The filter element or wire screen 11 has a base 13 connected to the channel 2. The filter element 11 is entirely surrounded by the clean-air chamber 12.

While one suction device 15 is connected to the clean-air chamber 12, a tapered end 14 of the filter element 11 communicates with a suction bend 16 of another suction device 17 which serves as a filter cleaning device. The suction bend 16 leads through a switching device 18 and a line 19 to a waste dump 20 that is subjected to negative pressure or suction. The switching device 18 includes a throttle flap 21 having a shaft 22 which is connected to a gear wheel 23.

The suction device 15 includes a fan having an impeller 24 which is drivable by a motor 25.

A switchable or indexable shutting device 26 in the form of a flap which is secured to a shaft 27, is provided on the inlet side of the filter element 11 that protrudes into the clean-air chamber 12. The shaft 27 has a toothed quadrant 28. The flap 26 can be pivoted out of the open position shown in the drawing into a closed position 26'. The filter element 11 has a device 29 for loosening adhering dust accumulations, which cooperates with the other suction or filter cleaning device 17.

The device 29 for loosening adhering dust accumulations includes blower nozzles disposed in a ring in the base 13, only three nozzles 30, 31 and 32 of which are shown in the drawing. The drawing shows that the blower nozzles 30, 31, 32 are disposed on the larger end of the funnel and are oriented approximately parallel to the inner wall of the filter element 11, so that outflowing air can sweep along the inner wall of the filter element 11 in the direction of the arrows. All of the blower nozzles are supplied through a line 33, which can be made to communicate with a source 35 of compressed air by means of a switchable valve 34.

The switchable device 26 for shutting the channel 2 and the other suction or filter cleaning device 17 share a common drive mechanism 36. The drive mechanism 36 is a controllable pneumatic piston/cylinder assembly, the piston rod 37 of which is connected to a control or locking device 38. The control device 38 is in the form of a slide rod, with offset rows of teeth 39, 40. The tooth row 40 meshes with the toothed quadrant 28 of the flap 26, as long as the flap is not yet completely closed. If the slide rod 38 moves in the direction of an arrow 41, the flap 26 closes and once the flap is completely closed, the tooth row 40 is disengaged from the toothed quadrant 28. Therefore, instead of the tooth row 40 engaging the toothed quadrant 28, the tooth row 39 meshes with the gear wheel 23 in order to open the closed throttle flap. Accordingly, the suction or filter cleaning device 17 is locked by the shutting device 26 as long as the shutting device 26 is not yet completely closed. Conversely, however, the shutting device 26 is also locked by the other suction or filter cleaning device 17. This is due to the fact that whenever the slide rod 38 moves in reverse, counter to the direction of the arrow 41, the throttle flap 21 is closed first, before the tooth row 40 can mesh with the toothed quadrant 28 again.

In order to initiate the filter cleaning operation for adjustable intervals, an actuatable timer switch 42 is provided. To this end, the timer switch 42 has an operative connection 43 leading to the motor 25, so that it can temporarily interrupt the operation of the suction device 15. The timer switch 42 has another operative connection 44 leading to the drive mechanism 36, in order to move the control device 38 first in the direction of the arrow 41 and then back into its initial position, counter to the direction of the arrow 41. The timer switch 42 also has a third operative connection 45 leading to a controller 46 of the valve 34, so as to cause spurts or shots of compressed air to emerge from the blower nozzles 30, 31, 32 after the flap 26 is closed.

During normal operation, the suction device 15 is switched on. The dust-laden air entering through the suction openings 3–6 flows through the filter element 11. The dust and fiber material is retained in the filter element and the clean air flows into the clean-air chamber 12 and from there it passes through an inlet nozzle 47 into the fan 15 and then into the open, for instance. The inlet nozzle 47 can be made smaller by incorporating nozzle inserts 47', especially for the sake of varying the output and adapting to desired suction ratios by providing smaller or larger inlet cross sections.

Meanwhile, the flap 26 is opened and the throttle flap 21 is closed. Negative pressure always prevails in the waste dump 20. The valve 34 is closed.

The timer switch 42 programs not only the filter cleaning intervals but also the points in time and durations of the individual actions to be performed therefor.

Once the point in time for filter cleaning has arrived, first the motor 25 is switched off. At the same time, the drive mechanism 36 is actuated, so as to displace the control device or slide rod 38 in the direction of the arrow 41. As a result, first the flap 26 is closed and thereupon the throttle flap 21 is opened, so that air flows out of the clean-air chamber 12 into the filter element through the mesh of the wire screen 11 and from there through the suction bend 16 and past the throttle flap 21 into the waste dump 20. A considerable negative pressure or suction prevails in the waste dump 20, so that dust accumulations are carried along as well. The cleaning of the inner surface of the filter is reinforced by the fact that compressed air simultaneously emerges form the blower nozzles 30, 31 and 32. After the filter cleaning operation has lasted for a few seconds, the valve 34 is closed, the throttle flap 21 is closed, the flap 26 is opened and the motor 25 is then reactivated.

Under certain conditions, in a simpler embodiment, the shutting device 26 can be dispensed with. Dust which is particularly formed of relatively long fibers, preferably sticks to the tapered end 14 of the filter element 11, where it forms a mass made up of fibers and dust. After the throttle flap 21 is opened, the mass is sucked into the waste dump 20, without requiring the shutting device 26 to be closed or the suction device 15 to be deactivated. This suction or aspiration of dirt is reinforced by activating the blower nozzles 30, 31, 32.

In an alternate embodiment of a device 29' for loosening adhering dust accumulations shown in FIG. 2, the switchable or indexable device 26 for shutting off the channel 2 is constructed as a centrally pivotable throttle flap 26" which leaves an annular gap 48, 49 free through which cleaning air 50, 51 can be directed against the inner surface of the filter element 11, in the illustrated closed position. In this embodiment, mutual interlocking between the filter cleaning device 17 and the device 29' is not necessary.

The invention is not intended to be restricted to the preferred embodiments shown and described herein. In particular, it is possible to construct the control device differently. Instead of the throttle flap 21, a more streamlined slide configuration or a conventional valve, may be selected.

We claim:

1. Dust-removal apparatus for textile machines and machine rooms, comprising a chamber containing dust-laden air, a clean-air chamber, a tube disposed between and separating said chamber containing dust-laden air from said clean-air chamber, at least part of said tube being a filter element, a suction device connected to said clean-air chamber, another switchable suction device in the form of a filter cleaning device connected to said tube, said tube having an inlet end, and means for selectively closing said inlet end of said tube.

2. Dust removal apparatus according to claim 1, wherein said closing means are in the form of a switchable shutting device.

3. Dust-removal apparatus according to claim 2, wherein said switchable shutting device is in the form of a flap selectively blocking and clearing said inlet of said tube.

4. Dust-removal apparatus according to claim 2, wherein said chamber containing dust-laden air is in the form of a channel extended along the textile machine, and including a locking device through which said filter cleaning device locks said switchable shutting device for shutting off said channel and through which said switchable device locks said filter cleaning device.

5. Dust-removal apparatus according to claim 4, including a common drive mechanism for said switchable device for shutting off said channel and said filter cleaning device, said locking device being in the form of a control device connected from said drive mechanism to said shutting device and said filter cleaning device.

6. Dust-removal apparatus according to claim 5, including an adjustable timer switch connected to said common drive mechanism for initiating a filter cleaning operation at adjustable intervals.

7. Dust-removal apparatus according to claim 2, wherein said filter element has an inner surface and includes a device for loosening adhering accumulations of dust, and said switchable shutting device is a centrally pivotable throttle flap having a closed throttling position defining at least one annular gap between said flap and said inner surface through which cleaning air can be directed against said inner surface of said filter element.

8. Dust removal apparatus according to claim 1, wherein said tube protrudes from said chamber carrying dust-laden air into said clean-air chamber.

9. Dust-removal apparatus according to claim 8, wherein said tube protruding into said clean-air chamber is in the form of a funnel having a tapered end connected to said other switchable suction device.

10. Dust-removal apparatus according to claim 8, wherein said tube is entirely in the form of a filter element.

11. Dust-removal apparatus according to claim 1, including a waste dump subjected to negative pressure, said other switchable suction device being in the form of a valve connected to said waste dump.

12. Dust-removal apparatus according to claim 1, wherein said filter element includes a device for loosening adhering accumulations of dust.

13. Dust-removal apparatus according to claim 12, wherein said filter element is in the form of a funnel having a larger funnel end and an inner wall, and said device for loosening adhering dust accumulations includes blower nozzles disposed at said larger funnel end and oriented substantially parallel to said inner wall of said filter element.

14. Dust-removal apparatus according to claim 1, wherein the textile machine has work stations, said chamber containing dust-laden air is in the form of a channel extended along the textile machine, and said channel has a row of suction openings formed therein, each of said openings being associated with a respective one of the work stations.

15. Dust-removal apparatus according to claim 14, wherein said suction openings formed in said channel carrying dust-laden air have openings with increasing widths as viewed in direction away from said filter element.

* * * * *